G. GUNTHER.
BIRD-CAGE.

No. 170,847.                    Patented Dec. 7, 1875.

Witnesses.
Otto Aufland
Chas Wahlers

Inventor.
Gottlob Gunther
Van Santvoord & Hauff
Attys.

UNITED STATES PATENT OFFICE.

GOTTLOB GUNTHER, OF NEW YORK, N. Y.

IMPROVEMENT IN BIRD-CAGES.

Specification forming part of Letters Patent No. 170,847, dated December 7, 1875; application filed October 4, 1875.

*To all whom it may concern:*

Be it known that I, GOTTLOB GUNTHER, of the city, county, and State of New York, have invented a new and useful Improvement in Bird-Cages, which improvement is fully set forth in the following specification, reference being had to the accompanying drawing, in which—

Figure 1:
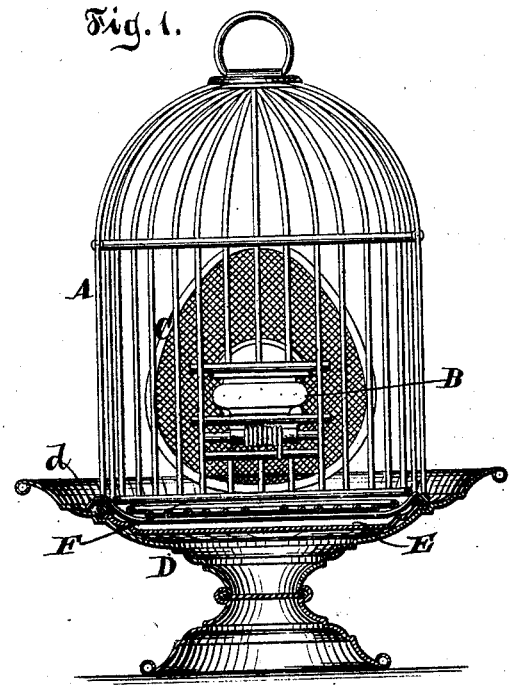
Figure 2:
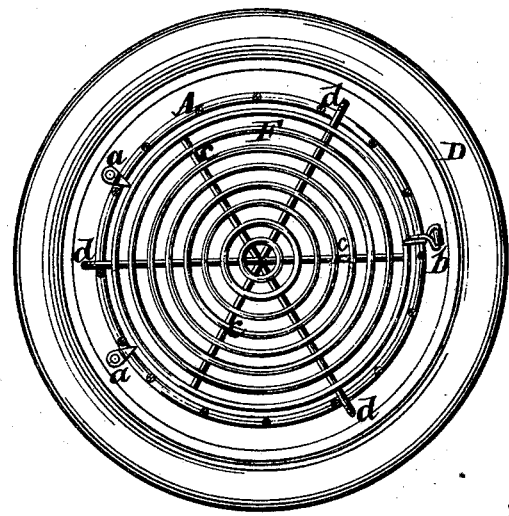

Figure 1 represents a vertical central section of a bird-cage containing my improvement. Fig. 2 is a horizontal section of the same.

Similar letters indicate corresponding parts.

My invention relates to improvements in cages for birds; and consists in a screen which is loosely or removably attached to the body of the cage, and which is fitted to a recess in the stand, so that it lies close to the top of said stand, or to a mat placed therein, whereby the bird is enabled to reach such particles of food or the sand which may drop through and lodge on the bottom or mat, and at the same time said screen may be removed with facility for the purpose of cleaning.

In the drawing, the letter A designates the body of a bird-cage, which has the ordinary feed-cup B, to which is added a cup-protector, C. D is the stand which forms the bottom of the cage, and which is fastened to the body A, in the present example, by hooks $a$ $a$ and a clamp, $b$, Fig. 2. On the stand may be placed a so-called mat, E, of sheet metal, which is fitted in a recess formed in the stand. F designates a screen made according to my invention, the same being made of shape corresponding to the cross-section of the body of the cage, and being constructed of wire, with radial bars $c$, one or both ends of which are bent to form hooks $d$. These hooks $d$ are made to project beyond the edge of the screen F in such a manner that, when the screen is placed within the body of the cage, the hooks catch over the bottom cross-band thereof, and thus the screen is prevented from dropping out when the body is removed from the stand. By using the hooks $d$ for attaching the screen F to the cage, the screen may be readily removed for cleaning, or for any other purpose; but I do not wish to confine myself to the hooks, as other devices may be substituted for them, if seen fit, such as hinges, which would permit the screen to swing down when the body of the cage is raised up. The screen F is sunken, as shown in Fig. 1, and it rests above the mat E, when the body of the cage is fastened to the stand.

The mat E, as hitherto used in cages, has for its object to receive on it any dirt, chaff, &c., dropped by the bird, and also sand or other material of a similar nature; and if these substances are allowed to accumulate the cage not only has an unsightly appearance, but the bird, in flying up, is liable to throw portions thereof out of the cage and soil the room. This disadvantage is obviated by the use of the screen F, which allows dirt or chaff to pass through it to the mat, or to the stand D in case the mat is not used, when such substances are not only in part hid from sight, but are kept clear of the screen, which constitutes a floor for the bird to rest upon, and at the same time the bird is enabled to reach the sand or seed through the open spaces of the screen, and in flying up or in flapping his wings the bird is not liable to throw sand or other matters out of the cage.

It may be remarked that, instead of constructing the screen F of wire, any other suitable material may be used for this purpose. Another advantage of the screen F, when attached to the body A, consists in that it forms a barrier to the escape of the bird when the body is removed from the stand D. The body may thus be removed from the stand when the bird is allowed to bathe, and the stand remains dry.

What I claim as new, and desire to secure by Letters Patent, is—

The removable screen F, connected to the body of the cage, in combination with the mat E, supported by the base or stand D, said parts being so arranged that the bird can reach the mat through the wire screen, all as described.

In testimony that I claim the foregoing I have hereunto set my hand and seal this 24th day of September, 1875.

G. GUNTHER. [L. S.]

Witnesses:
W. HAUFF,
E. F. KASTENHUBER.